United States Patent [19]

Park

[11] Patent Number: 5,758,740

[45] Date of Patent: Jun. 2, 1998

[54] AUTOMATIC REAR WHEEL SELF-CENTERING DEVICE FOR FOUR-WHEEL STEERING VEHICLES

[75] Inventor: Seong Yoon Park, Pusan, Rep. of Korea

[73] Assignee: Samsung Heavy Industries Co., Ltd., Seoul, Rep. of Korea

[21] Appl. No.: 563,840

[22] Filed: Nov. 28, 1995

[30] Foreign Application Priority Data

Feb. 28, 1995 [KR] Rep. of Korea ............... 1995-4013

[51] Int. Cl.$^6$ ............................................. B62D 5/06
[52] U.S. Cl. ........................... 180/442; 180/414; 180/403
[58] Field of Search .......................... 180/402, 403, 180/414, 417, 442

[56] References Cited

U.S. PATENT DOCUMENTS 3,556,243  1/1971  Susag ............................. 180/403 X
4,700,960  10/1987  Miki et al. ......................... 180/403
5,062,484  11/1991  Okamoto et al. .................. 180/403

*Primary Examiner*—Brian L. Johnson
*Assistant Examiner*—Gary Savitt
*Attorney, Agent, or Firm*—Kenyon & Kenyon

[57] ABSTRACT

An automatic rear wheel self-centering device for four-wheel steering vehicles automatically performs the rear wheel self-centering operation when the steering mode of the vehicle returns from another steering mode to the standard steering mode. The device has a branch conduit branched from a conduit leading from the steering unit to the steering mode selection valve. A conduit control valve is mounted to the branch conduit and is changeable between a neutral position blocking the branch conduit, a first position connecting the branch conduit to one side chamber of the rear wheel steering cylinder and a second position connecting the branch conduit to the other side chamber of the cylinder. The spool of the conduit control valve moves synchronous with a linear movement of the piston of the rear wheel steering cylinder, thereby changing the position of the conduit control valve between the above three positions.

15 Claims, 7 Drawing Sheets

I

II

III

IV

6
AUTOMATIC REAR WHEEL SELF-CENTERING DEVICE FOR FOUR-WHEEL STEERING VEHICLES

BACKGROUND OF THE INVENTION

1. Field of the Invention

The present invention relates in general to a four-wheel steering mechanism for four-wheel steering vehicles and, more particularly, to an automatic rear wheel self-centering device used in with a four-wheel steering mechanism having the Akerman-Jantoud type of steering link mechanism with an FHPS (Full Hydrostatic Power Steering) unit and adapted for automatically performing the rear wheel self-centering operation when the steering mode of the four-wheel steering mechanism returns from another steering mode, that is, a circular mode, a reverse mode or a crab mode, to a standard steering mode.

2. Description of the Prior Art

FIG. 1 shows a typical steering mechanism which can be used in various types of vehicles. In the above steering mechanism, an FHPS unit is integrated with an Akerman-Jantoud type of steering link mechanism. As shown in the drawing, the typical steering mechanism includes a steering wheel 101 which can be handled by a driver. The above steering mechanism also includes a steering unit 102 provided with a gyrotor. The above steering unit 102 acts as a metering pump which selectively supplies a constant amount of pressurized oil to a front wheel steering cylinder 105 in accordance with the rotating motion of the steering wheel 101. Both side chambers of the steering cylinder 105 are connected to the steering unit 102 through oil conduits 103 and 104, respectively. A piston 106 is received in the steering cylinder 105 in such a way that the cylinder 106 linearly reciprocates in the cylinder 105 to the right and left side of the drawing within a given stroke. Connected to both sides of the piston 106 are tie rods, that is, left and right tie rods 107a and 107b. The above tie rods 107a and 107b, each rod 107a, 107b being connected to the piston 106 at one end thereof, project out of both sides of the cylinder 105, respectively. Other ends of the tie rods 107a and 107b are pivoted to left and right steering knuckle arms 108a and 108b, respectively. The above steering knuckle arms 108a and 108b in turn are coupled to left and right front wheels 108a and 108b respectively through spindles, hubs and wheel rims. The spindles, hubs and wheel rims are not shown in the drawing.

When the steering wheel 101 is rotated, for example, counterclockwise to turn the vehicle to the left direction of the drawing, the steering unit 102 supplies the pressurized oil to one side chamber 105a of the steering cylinder 105 through the oil supplying conduit 103. In this case, the amount of pressurized oil supplied to the chamber 105a is in proportion to the rotating angle of the steering wheel 101. As the pressurized oil is supplied to the chamber 105a, the piston 106 moves to the right in the drawing. As a result of the rightward movement of the piston 106, the left and right side steering knuckle arms 108a and 108b are turned counterclockwise in the drawing as they are coupled to the piston 106 through the tie rods 107a and 107b. Therefore, the front wheels 109a and 109b are turned to the left side of the drawing, thereby turning the vehicle to the left. In the above steering operation, the pressurized oil of another side chamber 105b of the cylinder 105 is drained to a return tank (not shown) through the oil draining conduit 104.

When the steering wheel 101 is rotated clockwise to turn the vehicle to the right direction, the elements of the steering mechanism are reversely operated, thereby turning the vehicle to the right.

Four-wheel steering mechanisms for steering the front and rear wheels of a vehicle have been actively researched recently. The four-wheel steering mechanisms are in the early stages of being used practically.

The above four-wheel steering mechanisms remarkably reduce radius of curvature of a vehicle in turning motion and allow the vehicles to have various types of turning modes. In this regard, the four-wheel steering mechanisms are expected to be preferably used with, particularly, large-scaled vehicles such as trucks and various types of construction equipment such as excavators and cranes which are typically operated on rugged sites.

FIG. 2 schematically shows the construction of a typical four-wheel steering mechanism of the early development stages.

As shown in the drawing, the typical four-wheel steering mechanism is connected to a pair of front wheels 109a and 109b and to a pair of rear wheels 110a and 110b. A front wheel steering cylinder 105 is connected to the front wheels 109a and 109b so as to steer the wheels 109a and 109b, while a rear wheel steering cylinder 115 is connected to the rear wheels 110a and 110b so as to steer the wheels 110a and 110b. In the manner same as the front wheels 109a and 109b of FIG. 1, a second piston 116, a pair of second tie rods 117a and 117b and a pair of second steering knuckle arms 118a and 118b are included in the rear wheels 110a and 110b of the four-wheel steering mechanism. The steering unit 102 is connected to the front wheel steering cylinder 105 through a pair of oil conduits 103 and 104. The steering unit 102 is also connected to the rear wheel steering cylinder 115 through a pair of oil conduits 113 and 114. A steering mode selection valve 111 is mounted to the oil conduits 103, 104, 113 and 114 extending between the steering unit 102 and the steering cylinders 106 and 116. The spool of the above valve 111 is operated by a lever 112 handled by the driver, thereby selectively connecting the steering unit 102 to the oil conduits 103, 104, 113 and 114, while changing the steering mode between four different steering modes (I), (II), (III) and (IV). That is, the steering mode selection valve 111 is changed between the four modes (I), (II), (III) and (IV) in accordance with the displacement of the lever 112. The first mode (I) is a standard mode wherein the front wheels 109a and 109b can be steered, whereas the rear wheels 110a and 110b are fixed. The second mode (II) is a circular mode wherein both the front and rear wheels can be steered in the antiphase mode. The third mode (III) is a reverse mode wherein the front wheels 109a and 109b are fixed, whereas the rear wheels 110a and 110b can be steered. The fourth mode (IV) is a crab mode wherein both the front and rear wheels can be steered in the in-phase mode.

The front and rear wheels of the typical four-wheel steering vehicle in the above steering modes (I), (II), (III) and (IV) are schematically shown in FIGS. 3A to 3D, respectively. In order to prevent the drivers from being confused when distinguishing one steering mode from another while driving the vehicles, schematic symbols representing the above steering modes (I), (II), (III) and (IV) are typically displayed on the dashboard of a four-wheel steering vehicle. The above symbols are displayed by means of lamps or LCDs. A displaying signal for turning on an associated lamp or LCD corresponding to the object steering mode is sensed by an electrical contact lamp appropriately connected to the lever 112. The displaying signal in turn is applied to the associated lamp or LCD.

When changing the steering mode of the above four-wheel steering mechanism from the circular, reverse or crab mode (II, III, IV) to the standard mode (I), it is required to center the rear wheels prior to driving the vehicle in the standard mode (I) in good earnest. Centering the rear wheels prior to driving the vehicle in the standard in good earnest is named as "rear wheel centering". The term "rear wheel centering" means that the direction of the rear wheels is parallel to the ideal axis of the vehicle. When the steering mechanism fails to center the rear wheels in the above case, the vehicle in the standard mode can not run in the desired direction, this sometimes results in a serious traffic accident.

In the prior art, there is no other way but to carry out the rear wheel centering on the basis of driver's visual determination of the rear wheel's geometrical composition within the range of driver's vision. In this regard, the typical four-wheel steering mechanism fails to precisely perform the rear wheel centering operation. Furthermore, when the typical four-wheel steering mechanism is installed in either a large-scaled vehicle such as a truck or a vehicle structure of which prevent the driver from viewing the rear wheels, the steering mechanism has to be provided with an additional unit for sensing the rear wheel centering motion and informing the driver of the centering motion. That is, a limit switch or the like is mounted to the tie rods of the rear wheels. When the rear wheels reach a preset centered state, the above limit switch brings a sensing unit into an electrical contact position, thereby enabling the sensing unit to sense the preset centered state. The sensing unit in the above state informs the driver of the centered state of the rear wheels by means of a voice or visual alarm signal. When the above sensing unit generates the voice or visual alarm signal, the driver operates an additional fixing unit by an operating unit and thereby fixes the centered state of the rear wheels. The rear wheels in the above centered state allow the vehicle in the standard mode to run in good earnest. The above operating means may be an electrical, hydraulic or pneumatic means or a combined means thereof.

Therefore, it is difficult for the typical four-wheel steering mechanisms to accomplish the rear wheel centering state and waste much time in doing such a centering operation. Furthermore, it is difficult to increase the use of the four-wheel steering mechanisms due to several problems caused in the operational reliability and durability of both the limit switch and the additional fixing unit. The above problems also cause a serious obstacle for practical use of the four-wheel steering mechanisms.

SUMMARY OF THE INVENTION

It is, therefore, an object of the present invention to provide an automatic rear wheel self-centering device for four-wheel steering vehicles in which the above problems can be overcome and which automatically performs the rear wheel self-centering operation when the steering mode of the vehicle returns from another steering mode to the standard steering mode, thereby being convenient for the driver and improving the operational reliability and durability of the four-wheel steering mechanism.

In order to accomplish the above object, the present invention provides an automatic rear wheel self-centering device for a four-wheel steering vehicle comprising a steering mode selection valve for selectively supplying pressurized oil of a steering unit to the front and rear wheel steering cylinders of the vehicle, each steering cylinder having two side chambers thereby selectively steering front and rear wheels, further comprising: a branch conduit branched from a portion of an oil conduit leading from the steering unit to the steering mode selection valve; a conduit control valve mounted to the branch conduit and being changeable between a neutral position blocking the branch conduit, a first position connecting the branch conduit to one side chamber of the rear wheel steering cylinder and a second position connecting the branch conduit to the other side chamber of the rear wheel steering cylinder in accordance with a spool stroke of the conduit control valve; and means for moving a spool of the conduit control valve synchronous with a linear movement of a piston inside the rear wheel steering cylinder, thereby changing the position of the conduit control valve between the neutral, first and second positions.

The above conduit control valve allows the pressurized oil to proportionally flow through it in accordance with a moving stroke of the spool of the conduit control valve.

The spool moving means selectively places the conduit control valve in the neutral position when the piston of the rear wheel steering cylinder is placed in a middle portion of the cylinder, while the spool moving means places the conduit control valve in one of the first and second positions when the piston is eccentrically placed in either side chamber of the rear wheel steering cylinder, thereby supplying the pressurized oil to the side chamber of the rear wheel steering cylinder and moving the piston to the middle portion of the cylinder.

The above spool moving means has an arm member connected to a tie rod of the piston of the rear wheel steering cylinder at one end thereof, and a crank member one end of which pivoted to a second end of the arm member and a second end of said crank member hinged to the spool of the conduit control valve.

The above rear wheel self-centering device further includes a conduit checking valve mounted to the branch conduit and adapted for opening the branch conduit in a standard steering mode, but closing the branch conduit in other steering modes.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Figure 4:
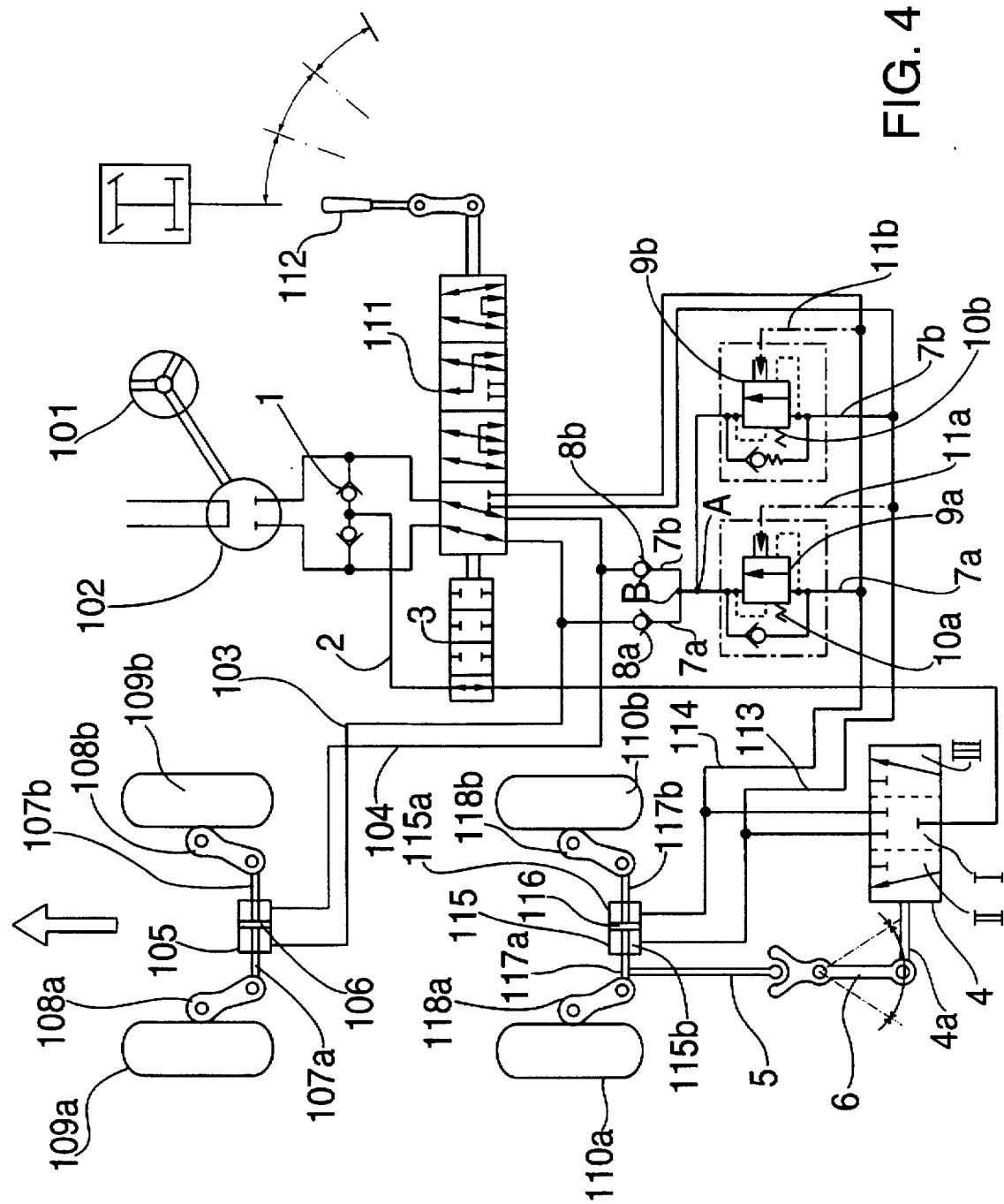
FIG. 4 is a schematic view of a four-wheel steering mechanism with a rear wheel self-centering device according to a preferred embodiment of the present invention, showing the steering mechanism in a straight running state of a vehicle in a standard mode.

FIG. 4 is a schematic view of a four-wheel steering mechanism with a rear wheel self-centering device according to a preferred embodiment of the present invention, showing the steering mechanism in a straight running state of a vehicle in a standard mode.

Figure 1:
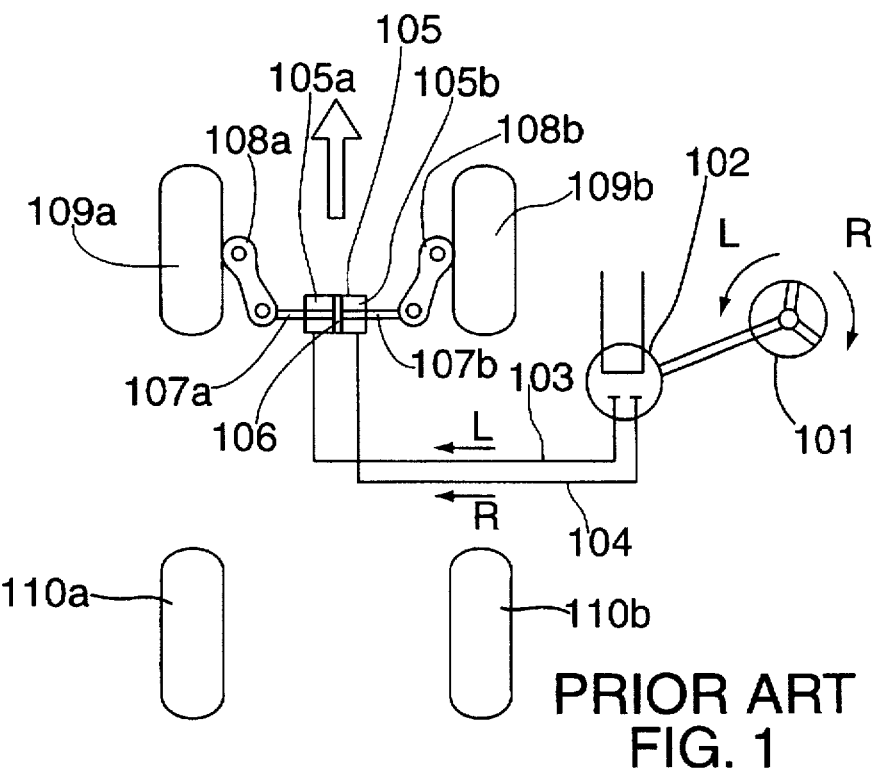
FIG. 1 is a schematic view showing the construction of a typical steering mechanism having the Akerman-Jantoud type of steering link mechanism integrated with an FHPS (full hydrostatic power steering) unit.
Figure 2:
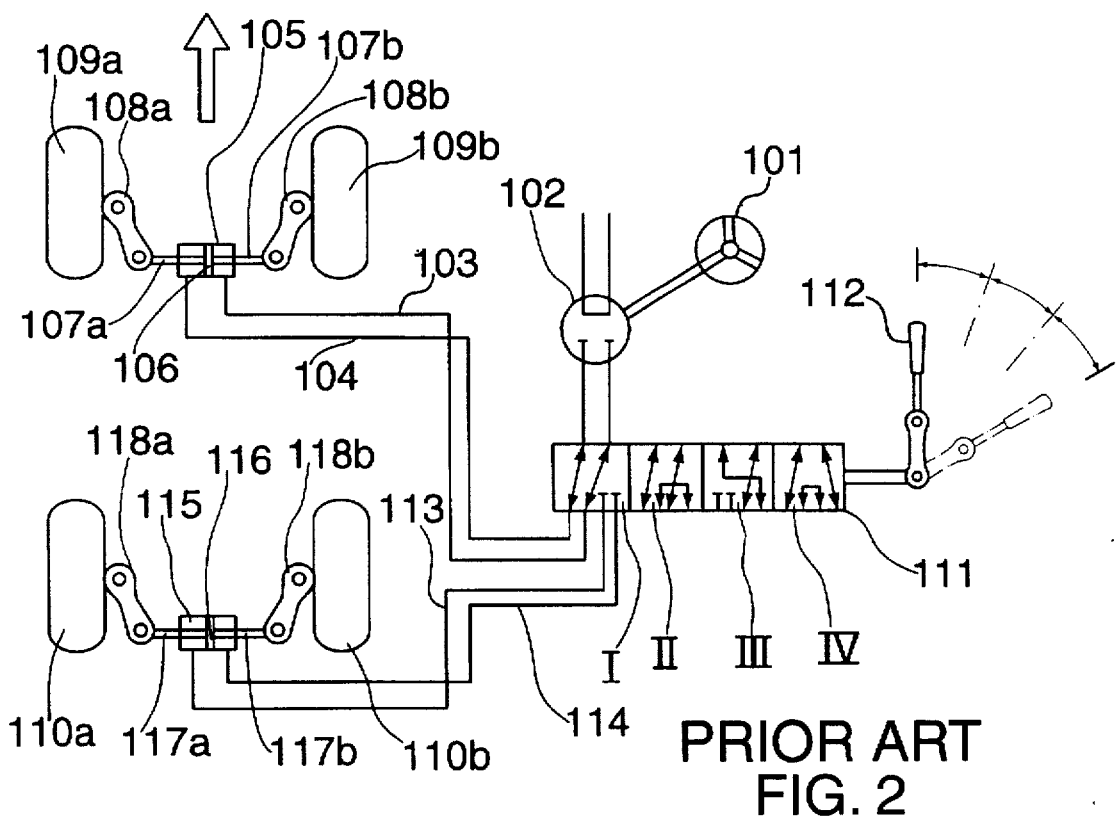
FIG. 2 is a schematic view showing the construction of a typical four-wheel steering mechanism.
Figure 3A:
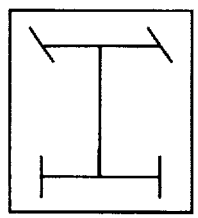
FIGS. 3A, 3B, 3C and 3D are schematic views showing the steered front and rear wheels in a standard steering mode, in a circular steering mode, in a reverse steering mode and in a crab steering mode of the typical four-wheel steering mechanism of FIG. 2, respectively.
Figure 3B:
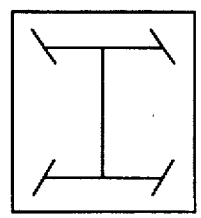
Figure 3C:
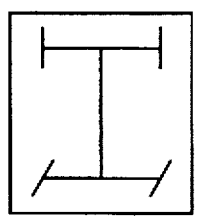
Figure 3D:
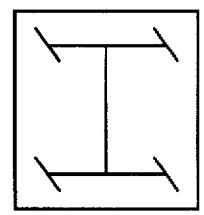

In the four-wheel steering mechanism of the present invention, most elements of the mechanism are the same as those of the typical four-wheel steering mechanism of FIG. 2. Those elements common to both the typical steering four-wheel mechanism and the mechanism of this invention will thus carry the same reference numerals. The construction and operation of the above elements are omitted from the following description.

As shown in FIG. 4, a pair of shuttle valves 1 are mounted to the oil conduits running from the steering unit 102 to the steering mode selection valve 111. A branch oil conduit 2 is branched from the above oil conduits through the shuttle valves 1. The above branch conduit 2 is selectively connected to either of the conduits 113 and 114 leading from the steering unit 102 to both side chambers 115a and 115b of the rear wheel steering cylinder 115. A conduit checking valve 3 is mounted to the branch conduit 2 and in turn directly connected to the steering mode selection valve 111. The internal oil passage of the above conduit control valve 3 is either closed or opened synchronous with the movement of of the steering mode selection valve 111. A conduit control value 4 is mounted to a junction between the branch conduit 2 and the conduits 113 and 114. The above valve 4 changeably connects the branch conduit 2 to the conduits 113 and 114 in accordance with a linear movement of a valve spool 4a.

The internal oil passage of the conduit checking valve 3 is opened exclusively when the steering mode selection valve 111 is in the first or standard mode (I) of the steering mechanism. However, the internal oil passage of the valve 111 is closed when the valve 111 is in either the second (II), third (III) or fourth (IV) mode of the steering mechanism.

The position of the internal oil passage of the above conduit control valve 4 is changed between the four positions (I), (II), (III) and (IV) in accordance with a moving stroke of the spool 4a. In the first or neutral position (I), the valve 4 connects neither conduit 113, 114 to the branch conduit 2. In the second position (II), the valve 4 connects the conduit 114 to the branch conduit 2. In the third position (III), the valve 4 connects the conduit 113 to the branch conduit 2. The above valve 4 is designed to completely close the branch conduit 2 when the valve 4 is placed precisely in the neutral position (I). However, the valve 4 is also designed to allow the pressurized oil to proportionally flow in the internal passage of the valve 4 in accordance with the moving stroke of the spool 4a when the valve 4 is in either transient position between the positions (I), (II) and (III).

Figure 5:
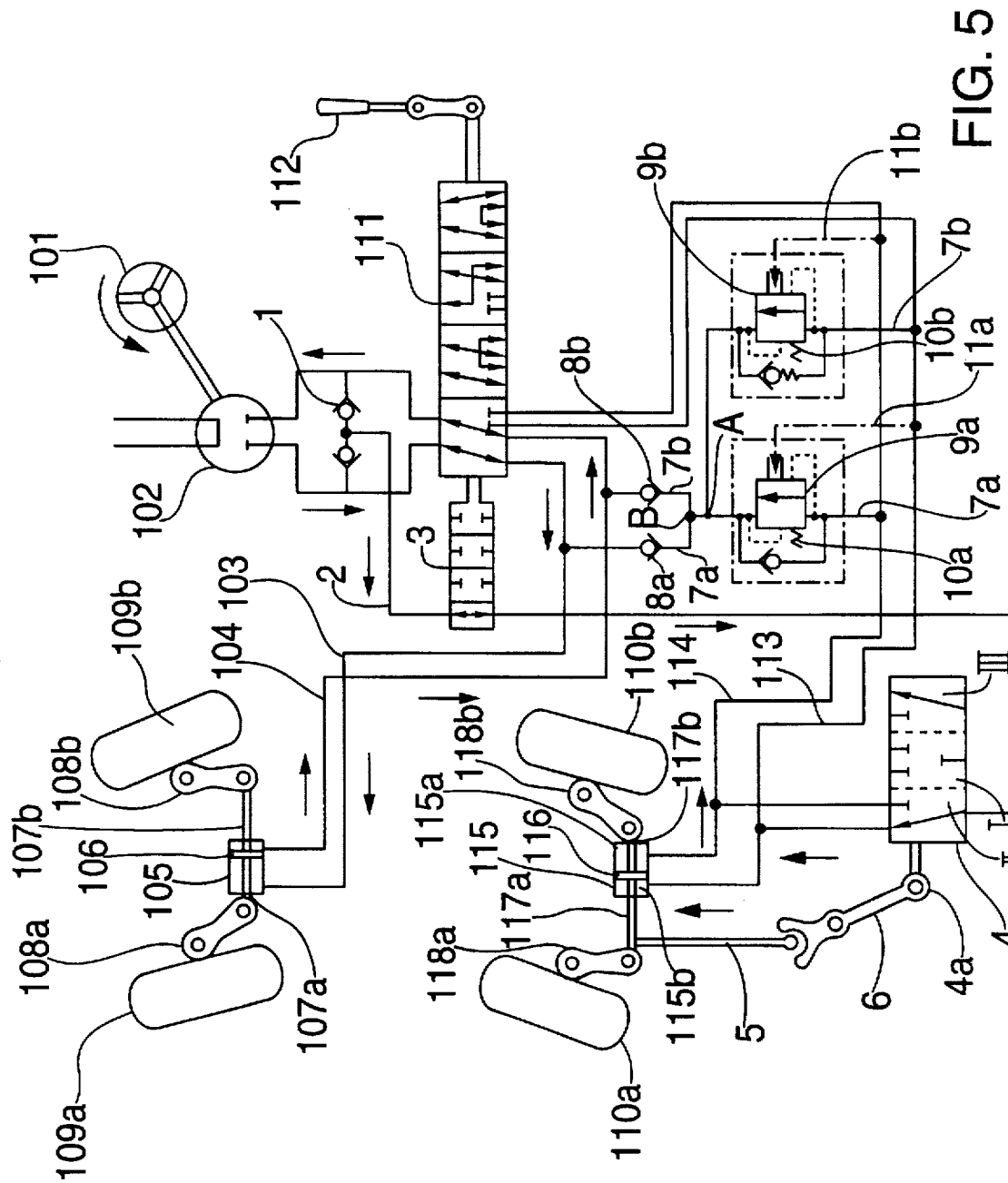
FIG. 5 is a view corresponding to FIG. 4, but showing the steering mechanism in the standard mode with the rear wheels which are not centered.

The device according to the present invention also includes an arm member 5 whose one end is connected to either tie rod 117a or 117b of the rear wheel steering cylinder 115. In the embodiment of FIG. 5, the arm member 5 is connected to, for example, the tie rod 117a. As the arm member 5 is connected to the tie rod 117a, the arm member 5 moves in accordance with the linear reciprocation of the rod 117a. Other end of the above arm member 5 is pivoted to one end of a pined crank member 6, thereby rotating the crank member 6 about the pivot pin. Another end of the above crank member 6 is pivoted to the spool 4a of the conduit control valve 4.

When the arm member 5 moves synchronous with a linear movement of the tie rod 117a in accordance with the movement of the piston 116 inside the rear wheel steering cylinder 115, the crank member 6 pivoted to the arm member 5 is rotated about its pivot pin to the left or right side of the drawing. As a result of the rotating motion of the crank member 6, the spool 4a pivoted to the other end of the crank member 6 linearly moves to the left or right in the drawing, thereby changing the oil flowing direction of the internal passage of the conduit control valve 4.

The geometrical relation between the rear wheel steering cylinder 115, the arm member 5, the crank member 6 and the conduit control valve 4 is as follows. That is, when the piston 116 in the cylinder 115 is eccentrically placed in either side chamber, for example, the chamber 115b of the cylinder 115 as shown in the drawing, the conduit control valve 4 changes its internal passage's oil flowing direction so as to supply pressurized oil to the chamber 115b and thereby to move the piston 116 toward the middle position of the cylinder 115. As the piston 116 gradually reaches the middle position of the cylinder 115, both the arm member 5 and the crank member 6 are operated synchronous with the movement of the piston 116 and linearly move the spool 4a of the conduit control valve 4. When the piston 116 completely reaches a middle position of the cylinder 115, the conduit control valve 4 is placed in the neutral or first position (I). In the above state, the piston 116 does not move any more because the conduit 113 or 114 is closed.

The conduits 113 and 114 run from the steering mode selection valve 111 to the side chambers 115b and 115a of the rear wheel steering cylinder 115, respectively. Meanwhile, the conduits 103 and 104 run from the steering mode selection valve 111 to the side chambers 105b and 105a of the front wheel steering cylinder 105, respectively. The above conduits 113 and 114 are connected to the conduits 103 and 104 through a pair of connection conduits 7a and 7b. That is, one connection conduit 7a is connected to the conduit 114 and meets the other connection conduit 7b, connected to the conduit 113, at the point A. The two connection conduits 7a and 7b are separated from each other at the other point B into a pair of conduits 7a' and 7b'. The connection conduits 7a' and 7b' in turn are connected to the conduits 103 and 104, respectively. A counter balance valve 9a, 9b is mounted to each conduit 7a, 7b before a point A, while a check valve 8a, 8b is mounted to each conduit 7a', 7b' after the point B.

The above check valves 8a and 8b exclusively allow the pressurized oil to flow from the conduits 113 and 114 toward the conduits 103 and 104. The positions of the counter balance valves 9a and 9b are initially set by valve springs 10a and 10b so as to close the conduits 7a and 7b, respectively. Each valve spring 10a or 10b biases one side of an associated counter balance valve 9a or 9b. When the other sides of the valves 9a and 9b are applied with the oil pressure through conduits 11a and 11b, the positions of the above valves 9a and 9b are changed into another position to open the conduits 7a and 7b. The above conduits 11a and 11b are arranged to apply the oil pressure of the conduits 113 and 114 to the counter balance valves 9a and 9b, respectively. In the counter balance valve 9a which is mounted to the conduit 7a connected to the conduit 114, the above conduit 11a for applying the oil pressure to the above valve 9a is connected to the conduit 113 thereby transmitting the oil pressure of the conduit 113 to the valve 9a. In the other counter balance valve 9b which is mounted to the conduit 7b connected to the conduit 113, the above conduit 11b for applying the oil pressure to the valve 9b is connected to the conduit 114, thereby transmitting the oil pressure of the conduit 114 to the valve 9b.

The operational effect of the above rear wheel self-centering device will be described thereafter.

The rear wheel self-centering device of the invention is exclusively used when changing from one steering mode of the four-wheel steering mechanism to another, for example, from the circular mode, the reverse mode or the crab mode, to the standard mode wherein the rear wheels have to be centered. Therefore, the above device should prevent obstacles from interfering with the operation of the four-wheel steering mechanism in the other steering modes, that is, the circular, reverse and crab modes.

When the rear wheels 110a and 110b in the standard mode are not centered as shown in FIG. 5, the arm member 5 is eccentrically placed relative to the crank member 6. The crank member 6 in the above state is thus rotated in proportion to the eccentricity of the arm member 5, thereby changing the oil flowing direction of the internal oil passage of the conduit control valve 4. Of course, the above motion is achieved by the geometrical arrangement of the arm member 5, crank member 6 and valve spool 4a.

When the steering wheel 101 in the above state is turned to the left or right, the steering unit 102 supplies the pressurized oil to the front wheel steering cylinder 105 through the steering mode selection valve 111 whose mode has been changed into the standard mode. The above pressurized oil thus flows into the branch conduit 2 through the shuttle valve 1 and in turn passes the conduit checking valve 3 before the oil passes the steering mode selection valve 111. In this case, the conduit checking valve 3 opens the conduit 2 synchronous with the operation of the steering mode selection valve 111 in the standard mode.

The pressurized oil passes the conduit checking valve 3 and in turn passes the conduit control valve 4 so as to be supplied to one of the chambers 115a and 115b of the rear wheel steering cylinder 115. In the embodiment of FIG. 5, the pressurized oil is supplied to the chamber 115b in which the piston 116 is placed. Therefore, the piston 116 is biased by the pressurized oil to the right side in the drawing until the piston 116 reaches the center of the cylinder 115. When the piston 116 reaches the center of the cylinder 115, the conduit control valve 4 is placed in the neutral position for closing the branch conduit 2. In this case, the neutral position of the valve 4 is achieved by the geometrical relation between the arm member 5 connected to the tie rod 117a of the piston 116, the crank member 6 and the spool 4a. The chamber 115b in the above state is no longer supplied with pressurized oil. Therefore, the rear wheel self-centering device of this invention automatically centers the rear wheels and stops the rear wheel self-centering operation.

While the pressurized oil is supplied to the chamber 115b of the cylinder 115 and moves the piston 116 to the center of the cylinder 115 and thereby accomplishes the rear wheel self-centering operation, the pressurized oil in the other chamber 115a should be smoothly drained. The pressurized oil of the chamber 115a in the above state is drained through the conduit 114. In the above state, the pressurized oil of the chamber 115a flows into the counter balance valve 9a through a conduit 7a connected to the conduit 114 as the conduit 114 is closed by the steering mode selection valve 111. The counter balance valve 9a in the above state is set by the valve spring 10a to close the conduit 7a. The pressurized oil is supplied to the chamber 115b of the rear wheel steering cylinder 115 through both the conduit control valve 4 and the conduit 113, thereby biasing the piston 116 to the right side in the drawing. When the piston 116 is biased by the pressurized oil to the right side, the pressurized oil of the conduit 113 flows into the counter balance valve 9a through the conduit 11a and biases the valve 9a while compressing the valve spring 10a, thereby causing the valve 9a to open the conduit 7a. Therefore, the pressurized oil of the chamber 115b of the rear wheel steering cylinder 115 orderly in sequence passes the conduit 114, the conduit 7a, the counter balance valve 9a, the check valve 8b, the steering mode selection valve 111 and the steering unit 102 prior to being returned to a return tank (not shown). While the pressurized oil of the chamber 115b is drained to the return tank, the oil does not pass the check valve 8a. This is because the pressurized oil supplied by the rotating motion of the steering wheel 101 is also applied to the conduit 103 and because the pressure of the oil returned to the return tank is remarkably lower than that of the oil which flows in the conduit 103 and is pumped up by a pump.

After the rear wheel self-centering operation has been accomplished, the front wheels 109a and 109b may be steered in a conventional manner. That is, the front wheels 109a and 109b may be steered by the rotating motion of the steering wheel 101 in the desired direction or steered and the vehicle driven simultaneously.

That is, the rear wheel self-centering device of the invention automatically performs the rear wheel self-centering operation when the steering wheel 101 in the standard mode is handled to the left or right either when stopping or driving the vehicle.

In the above rear wheel self-centering operation, the front wheels 109a and 109b are turned in the direction same as the rotating direction of the steering wheel 101 in the manner same as described for the rear wheels 109a and 109b. When the front wheels 109a and 109b are applied with a concentrated load, the above rear wheel self-centering operation can be performed without causing any movement in the front wheels 109a and 109b. On the other hand, when the front wheels 109a and 109b are not applied with the concentrated load, the front wheels 109a and 109b are turned to the left or right up to the maximum until the front wheels 109a and 109b can no longer be steered structurally. Thereafter, the above rear wheel self-steering operation is performed.

The four-wheel steering mechanism provided with the above rear wheel self-centering device in each steering mode is operated as follows.

1. Standard Mode

FIG. 4 shows the four-wheel steering mechanism with the rear wheels self-centering device of this invention in a straight running state of the vehicle in the standard mode. In the above standard mode, the front wheels 109a and 109b are steered in accordance with the rotating motion of the steering wheel 101, while the rear wheels 110a and 110b are fixed to the centered position.

In order to steer the front wheels 109a and 109b, the pressurized oil is supplied from the steering unit 102 to the front wheel steering cylinder 105 in accordance with the rotating motion of the steering wheel 101 while being completely checked by the check valves 8a and 8b. As the pressurized oil is checked by the valves 8a and 8b while the oil is supplied to the cylinder 105, there is no problem in steering the front wheels 109a and 109b regardless of the rotating direction of the steering wheel 101.

Meanwhile, the rear wheels 110a and 110b does not have to be steered but are fixed to the centered state even when the wheels 110a and 110b are applied with any external force forcibly steering the rear wheels 110a and 110b. When the rear wheels 110a and 110b are applied with an external force applying a pressure to the conduit 113, the counter balance valve 9a opens the conduit 7a by the pressure of the conduit 11a connected to the conduit 113. In the above state, the conduit 114 is connected to the check valves 8a and 8b, while the piston 116 may suck the pressurized oil of the conduit 114 into the chamber 115a of the cylinder 115. However, the check valves 8a and 8b in the above state check flowing of the pressurized oil through the conduit 114, thereby preventing the rear wheels 110a and 110b from being suddenly moved by an external force. In the above state, it is preferred to set the relief pressure of the counter balance valve 9a so that the relief pressure is substantially higher than the oil pressure applied to the rear wheel steering cylinder 115.

When the relief pressure of the valve 9a is set as described above, the rear wheels 110a and 110b are prevented from being suddenly steered by the external force. In this regard, the four-wheel steering mechanism having the rear wheel self-centering device of the present invention can be normally operated in the standard mode without causing any operational problems due to the rear wheel self-centering device.

2. Circular Mode

Figure 6:
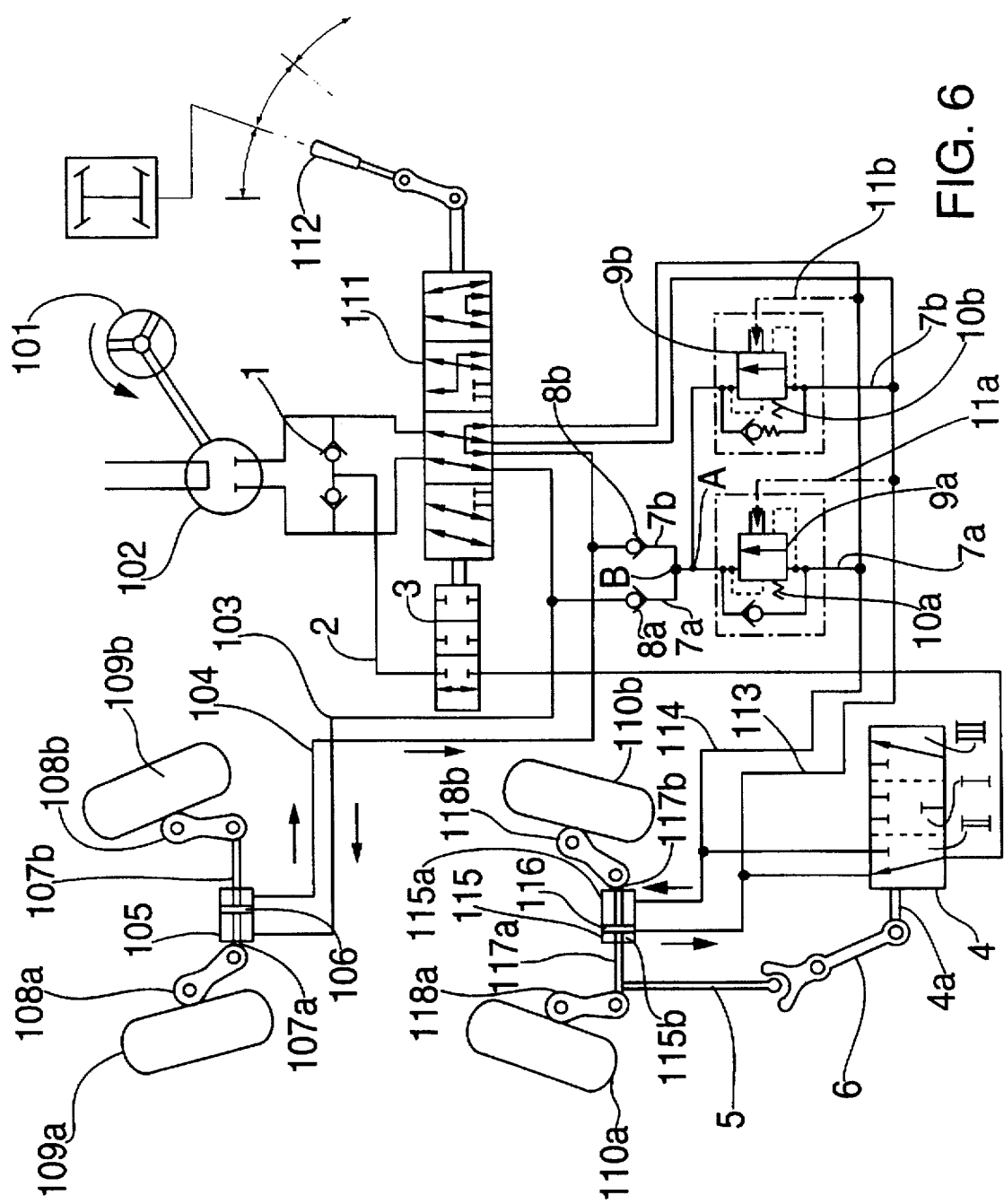
FIG. 6 is a view corresponding to FIG. 4, but showing the steering mechanism in a circular mode.

FIG. 6 shows the four-wheel steering mechanism with the rear wheel self-centering device of this invention in the circular mode. When the steering wheel 101 in the circular mode is rotated counter clockwise in the drawing, the pressurized oil of the steering unit 102 is supplied to the front wheel steering cylinder 105 through the conduit 104, thereby steering the front wheels 109a and 109b. The pressurized oil of the cylinder 105 flows out of the cylinder 105 through the conduit 103. The flowing direction of the pressurized oil flowing in the conduit 103 is changed by the steering mode selection valve 111. The above pressurized oil thus flows into the rear wheel steering cylinder 115 through the conduit 114, thereby steering the rear wheels 110a and 110b. Thereafter, the pressurized oil returns to the return tank through the conduit 113, the steering mode selection valve 111 and the steering unit 102. The above four-wheel steering mechanism performs in the circular mode while the pressurized oil is circulated in the mechanism as described above.

In the above circular mode, the pressure applied to the conduit 114 acts as the pressure which is applied to the counter balance valve 9b through the conduit 11a to open the valve 9b. As the counter balance valve 9b is opened by the oil pressure as described above, the conduit 113 is connected to the check valves 8a and 8b and to a check valve provided in the other counter balance valve 9a. However, all of the above check valves 8a and 8b and the check valve of the counter balance valve 9a close the conduit by the oil pressure generated in the conduits 103, 104 and 113. Hence, the pressurized oil can not pass the counter balance valve 9b even though the valve 9b is opened as described above. Therefore, the four-wheel steering mechanism having the rear wheel self-centering device of the invention can be normally operated in the circular mode without causing any operational problems.

3. Reverse Mode

Figure 7:
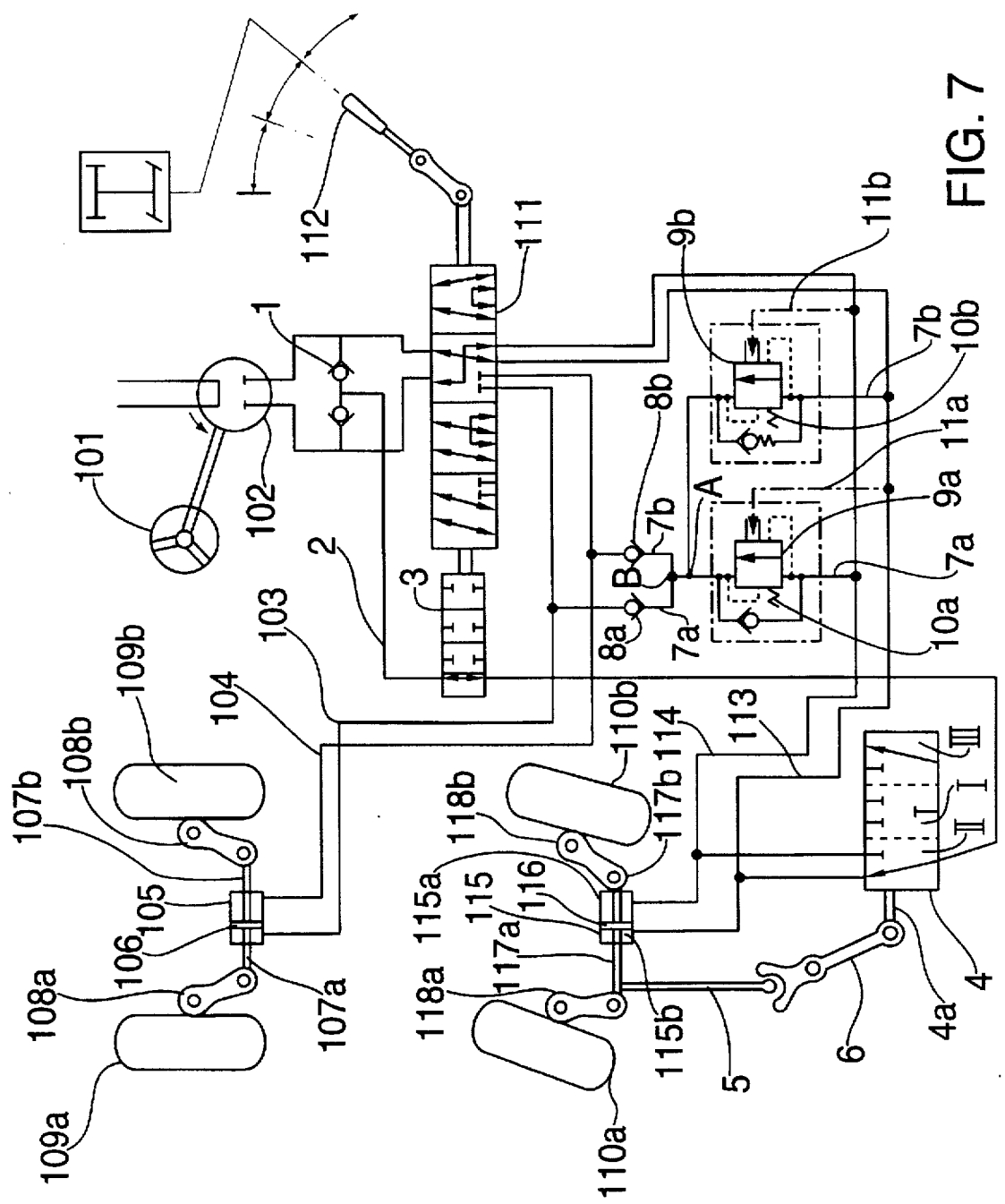
FIG. 7 is a view corresponding to FIG. 4, but showing the steering mechanism in a reverse mode.

FIG. 7 shows the four-wheel steering mechanism with the rear wheel self-centering device of this invention in the reverse mode.

When the steering wheel 101 in the reverse mode is rotated counter-clockwise in the drawing, the pressurized oil of the steering unit 102 is supplied to the rear wheel steering cylinder 115 through the conduit 114, thereby moving the piston 116 and steering the rear wheels 110a and 110b to the left. When steering the rear wheels 110a and 110b to the left, the pressurized oil flowing out of the rear wheel steering cylinder 115 returns to the return tank through the conduit 113.

When the pressure of the conduit 114 in the above circular mode is increased and exceeds a predetermined pressure level, the pressurized oil is supplied to the counter balance valve 9b through the conduit 11b, thus opening the conduit 7b and connecting the conduit 113 to the conduits 103 and 104 by means of the check valves 8a and 8b. However, as the pressurized oil of the conduit 113 is the return oil which has a relatively low pressure, the oil of the conduit 113 scarcely has any influence on the conduits 103 and 104. Even when the negative pressure of the conduit 113 is sufficiently high enough to influence both conduits 103 and 104, the negative pressure is desirably offset as it uniformly acts on both sides of the piston 106 inside the front wheel steering cylinder 105. Therefore, the four-wheel steering mechanism having the rear wheel self-centering device of the invention can be normally operated in the reverse mode without causing any operational problems.

4. Crab Mode

Figure 8:
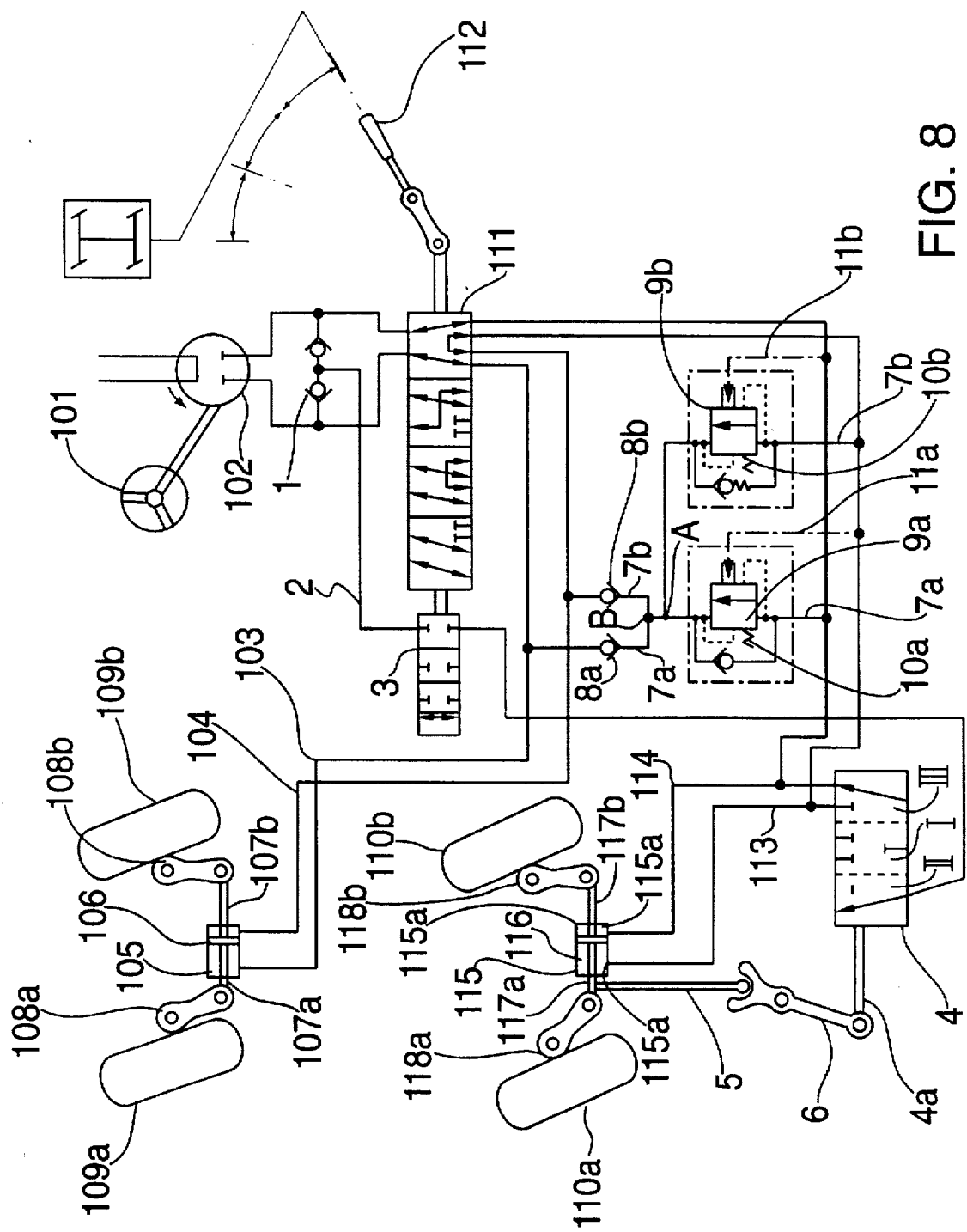
FIG. 8 is a view corresponding to FIG. 4, but showing the steering mechanism in a crab mode.

FIG. 8 shows the four-wheel steering mechanism with the rear wheel self-centering device of this invention in the crab mode.

When the steering wheel 101 in the crab mode is rotated counter clockwise in the drawing, the pressurized oil of the steering unit 102 is supplied to the front wheel steering cylinder 105 through the conduit 103, thereby steering the front wheels 109a and 109b. The pressurized oil of the cylinder 105 flows out of the cylinder 105 through the conduit 104. The pressurized oil flowing out of the cylinder 105 in turn passes the steering mode selection valve 111 and flows into the rear wheel steering cylinder 115 through the conduit 113, thereby steering the rear wheels 110a and 110b. Thereafter, the pressurized oil returns to the return tank through the conduit 114, the steering mode selection valve 111 and the steering unit 102. The above four-wheel steering mechanism performs the crab mode while the pressurized oil is circulated in the mechanism as described above.

In the above crab mode, both conduits 103 and 104 are applied with pressure, while the check valves 8a and 8b close the conduits 7a and 7b, thereby preventing the pressurized oil from flowing through the conduits 7a and 7b. Meanwhile, the pressure generated in either conduit 113 or 114 is applied to an associated counter balance valve 9a or 9b through an associated conduit 11a or 11b, thereby acting as pressure opening the associated counter balance valve 9a or 9b. Therefore, the conduit 113 or 114 is connected to the check valves 8a and 8b. Since the pressure in the conduits 103 and 104 is higher than that of the conduits 113 and 114, the pressurized however, oil can not pass the check valves 8a and 8b. Therefore, the four-wheel steering mechanism having the rear wheel self-centering device of the invention can be normally operated in the crab mode without causing any operational problems.

As described above, the rear wheel self centering device of the present invention automatically performs the rear wheel self-centering operation while changing from one steering mode of a four-wheel steering mechanism to another, for example from a circular mode, a reverse mode or a crab mode, to a standard mode. The above rear wheel centering operation when changing the steering mode from another mode to the standard mode has been noted to cause inconvenience to the drivers of four-wheel steering vehicles. However, the rear wheel self-centering device of the present invention is convenient to the drivers. Another advantage of the above rear wheel self-centering device lies in that the device remarkably improves the operational reliability and durability of the four-wheel steering mechanism having the rear wheel centering device as the centering mechanism performs both the steering operation and the rear wheel centering operation using mechanical and hydraulic elements.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An automatic rear wheel self-centering device for a four-wheel steering vehicle comprising a steering mode selection valve for selectively supplying pressurized oil for a steering unit to front and rear wheel steering cylinders of said vehicle, each steering cylinder having two side chambers, thereby selectively steering said front and rear wheels, further comprising:

a branch conduit branched from a portion of an oil conduit leading from said steering unit to said steering mode selection valve;

a conduit control valve mounted to said branch conduit and being changeable between a neutral position blocking the branch conduit, a first position connecting the branch conduit to one side chamber of said rear wheel steering cylinder and a second position connecting the branch conduit to the other side chamber of said rear wheel cylinder in accordance with a spool stroke of said conduit control valve; and means for moving a spool of said conduit control valve synchronous with a linear movement of a piston inside said rear wheel steering cylinder, thereby changing the position of said conduit control valve between said neutral, first and second positions.

2. The rear wheel self-centering device according to claim 1, wherein said conduit control valve allows the pressurized oil to proportionally flow through it in accordance with a moving stroke of said spool of the conduit control valve.

3. The rear wheel self-centering device according to claim 1, wherein said spool moving means selectively places said conduit control valve in said neutral position when the piston of the rear wheel steering cylinder is placed in a middle portion of said rear wheel steering cylinder, while the spool moving means places said conduit control valve in one of said first and second positions when said piston is eccentrically placed in either of the two side chambers of said rear wheel steering cylinder, thereby supplying the pressurized oil to said side chamber of the rear wheel steering cylinder and moving the piston to the middle portion of said rear wheel steering cylinder.

4. The rear wheel self-centering device according to claim 1, wherein said spool moving means comprises:

an arm member connected at one end to a tie rod of said piston of the rear wheel steering cylinder; and a crank member, one end of which is pivoted to a second end of said arm member, and a second end of which crank member is hinged to said spool of the conduit control valve.

5. The rear wheel self-centering device according to claim 4, wherein said piston, arm member, crank member and spool of the conduit control valve are geometrically arranged such that said spool is placed in the neutral position of said conduit control valve when the piston is placed in a neutral position of said rear wheel steering cylinder, while said spool is placed in one of said first and second positions of the conduit control valve in proportion to eccentricity of said piston when said piston is eccentrically place in either of the two side chambers of said rear wheel steering cylinder.

6. The rear wheel self-centering device according to claim 1, further comprising:

a conduit checking valve mounted to said branch conduit and adapted for opening the branch conduit in a standard steering mode, but closing the branch conduit in other steering modes.

7. The rear wheel self-centering device according to claim 4, further comprising:

a conduit checking valve mounted to said branch conduit and adapted for opening the branch conduit in a standard steering mode, but closing the branch conduit in other steering modes.

8. The rear wheel self-centering device according to claim 6, wherein said steering mode selection valve comprises a spool, and said conduit checking valve is directly connected to said steering mode selection valve and adapted for either opening or closing the branch conduit synchronous with movement of said steering mode selection valve spool.

9. The rear wheel self-centering device according to claim 7, wherein said steering mode selection valve comprises a spool, and said conduit checking valve is directly connected to said steering mode selection valve and adapted for either opening or closing the branch conduit synchronous with movement of said steering mode selection valve spool.

10. The rear wheel self-centering device according to claim 1, further comprising:

a pair of connection conduits respectively connecting a pair of first conduits, leading from said steering mode selection valve to both side chambers of said rear wheel steering cylinder, to a pair of second conduits leading from said steering mode selection valve to both side chambers of said front wheel steering cylinder; and a counter balance valve and a check valve, both valves being mounted to each connection conduit.

11. The rear wheel self-centering device according to claim 4, further comprising:

a pair of connection conduits respectively connecting a pair of first conduits, leading from said steering mode selection valve to both side chambers of said rear wheel steering cylinder, to a pair of second conduits leading from said steering mode selection valve to both side chambers of said front wheel steering cylinder; and a counter balance valve and a check valve, both valves being mounted to each connection conduit.

12. The rear wheel self-centering device according to claim 6, further comprising: a pair of connection conduits respectively connecting a pair of first conduits, leading from said steering mode selection valve to both side chambers of said rear wheel steering cylinder, to a pair of second conduits leading from said steering mode selection valve to both side chambers of said front wheel steering cylinder; and a counter balance valve and a check valve, both valves being mounted to each connection conduit.

13. The rear wheel self-centering device according to claim 10, wherein said connection conduits meet one another at a first point and in turn are separated from each other at a second point so as to be connected to said second conduits leading from said steering mode selection valve to both side chambers of said front wheel steering cylinder; and said counter balance valve is mounted to each connection conduit before said first point, while said check valve is mounted to each conduit after said second point.

14. The rear wheel self-centering device according to claim 11, wherein said connection conduits meet one another at a first point and in turn are separated from each other at a second point so as to be connected to said second conduits leading from said steering mode selection valve to both side chambers of said front wheel steering cylinder; and said counter balance valve is mounted to each connection conduit before said first point, while said check valve is mounted to each conduit after said second point.

15. The rear wheel self-centering device according to claim 12, wherein said connection conduits meet one another at a first point and in turn are separated from each other at a second point so as to be connected to said second conduits leading from said steering mode selection valve to both side chambers of said front wheel steering cylinder; and said counter balance valve is mounted to each connection conduit before said first point, while said check valve is mounted to each conduit after said second point.

* * * * *